United States Patent
Brede

(10) Patent No.: US 10,427,701 B1
(45) Date of Patent: Oct. 1, 2019

(54) APPLIANCE STAND AND DOLLY

(71) Applicant: Duane S. Brede, Honolulu, HI (US)

(72) Inventor: Duane S. Brede, Honolulu, HI (US)

( * ) Notice: Subject to any disclaimer, the term of this patent is extended or adjusted under 35 U.S.C. 154(b) by 0 days.

(21) Appl. No.: 15/946,042

(22) Filed: Apr. 5, 2018

(51) Int. Cl.
| | |
|---|---|
| *B62B 3/02* | (2006.01) |
| *D06F 37/26* | (2006.01) |
| *F24C 15/08* | (2006.01) |
| *F25D 11/00* | (2006.01) |

(52) U.S. Cl.
CPC ............ *B62B 3/02* (2013.01); *D06F 37/26* (2013.01); *F24C 15/08* (2013.01); *B62B 2301/04* (2013.01); *F25D 11/003* (2013.01); *F25D 2400/38* (2013.01)

(58) Field of Classification Search
CPC ...... D06F 37/26; F24C 15/08; B62B 2301/04; B62B 3/02; F25D 11/003; F25D 2400/38; B62D 33/08; B62D 61/12; B62D 21/14
USPC .................................. 280/79.3, 43.24, 43.14
See application file for complete search history.

(56) References Cited

U.S. PATENT DOCUMENTS

| | | | |
|---|---|---|---|
| 2,132,316 A | 10/1938 | Newton | |
| 5,299,826 A | 4/1994 | Flowers | |
| 6,386,560 B2 * | 5/2002 | Calender | B62B 5/0083 280/47.34 |
| 6,929,270 B1 * | 8/2005 | Flagstad | B62B 5/0083 280/79.11 |
| 7,036,833 B1 * | 5/2006 | Berna | B62B 3/04 280/166 |
| 7,383,612 B2 | 6/2008 | Bushey | |
| 2014/0183322 A1 | 7/2014 | Starr et al. | |
| 2017/0361651 A1 * | 12/2017 | Clapp | B60B 33/0007 |

\* cited by examiner

*Primary Examiner* — S. Joseph Morano
*Assistant Examiner* — Hilary L Johns
(74) *Attorney, Agent, or Firm* — Cramer Patent & Design, PLLC; Aaron R. Cramer

(57) ABSTRACT

An appliance dolly has a platform with a caster wheel and a height adjustable stand disposed at each under side corner. At each upper side corner are a plurality of adjustable stays. The stays are configurable to retain the stands of an appliance which rests upon the stand and dolly.

6 Claims, 5 Drawing Sheets

APPLIANCE STAND AND DOLLY

RELATED APPLICATIONS

Not applicable.

FIELD OF THE INVENTION

The presently disclosed subject matter is directed to a portable stand particularly suited for supporting an appliance.

BACKGROUND OF THE INVENTION

There are many heavy appliances in the typical residential home including refrigerators, stoves, dishwashers, and the like. However, the typical washer and dryer combination, also heavy, requires the most moving in and out of their usage position. The reason for this movement includes access for cleaning, repair, movement for access to other mechanical equipment, piping, and the like. Whatever the reason, movement of these appliances is difficult not only due to their weight, but also due to their standard adjustable threaded leveling foot which makes sliding on the flooring surface very difficult. While rolling casters would certainly assist in this effort, they are not feasible due to the dynamic loading of the both the washer and dryer which would result in the appliances moving about in the room during operation.

Accordingly, there exists a need for a means by which washers and dryers can be firmly supported upon floor surfaces during use, but yet remain easy to move to provide access. The development of the movable operational platform for washer dryer units fulfills this need.

SUMMARY OF THE INVENTION

The principles of the present invention provide for such a portable platform for an appliance that is generally planar and rectangular and that is capable of independent adjustment at each front corner with a front foot assembly, and at each rear corner with a rear foot assembly to raise and lower the platform. The platform has a front wall, a rear wall, a pair of sidewalls, an upper wall, and a bottom wall. Such a platform also has a pair of front caster assemblies that are rotatably attached to the bottom wall at the front of the platform and a pair of caster assemblies that are fixedly attached to the bottom wall at the rear. Four (4) stay assemblies, each affixed to and located adjacent to a corner of the base platform upper wall, are also each configured to securely retain a leg of the appliance. In a preferred embodiment, the base platform further includes a protective coating.

It is an object of the present invention to provide that each of the pair of front foot assemblies has a first foot base, and a first shaft adjustably attached to the base platform, having a first shaft first end affixed to the first foot base. Similarly, each of the pair of rear foot assemblies has a second foot base and a second shaft adjustably attached to said base platform, having a second shaft first end affixed to said second foot base. In certain embodiments, the first and second shafts each pass through the bottom wall and the upper wall. In certain other embodiments, each of the front and rear foot assemblies has a non-marring surface located on a bottom surface of the respective foot base.

It is a further object to provide that the pair of rotating caster assemblies includes a caster wheel mounted via an axle to a caster frame, which is in turn mounted to a caster plate, which is in turn rotatably attached to the base platform. In at least one (1) embodiment, the rotatable caster assemblies are mounted within a recessed area.

It is a further object to provide that the pair of fixed caster assemblies includes a caster wheel mounted via an axle to a caster frame, which is in turn fixedly attached to the base platform. In at least one (1) embodiment, the fixed caster assemblies are mounted within a recessed area.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
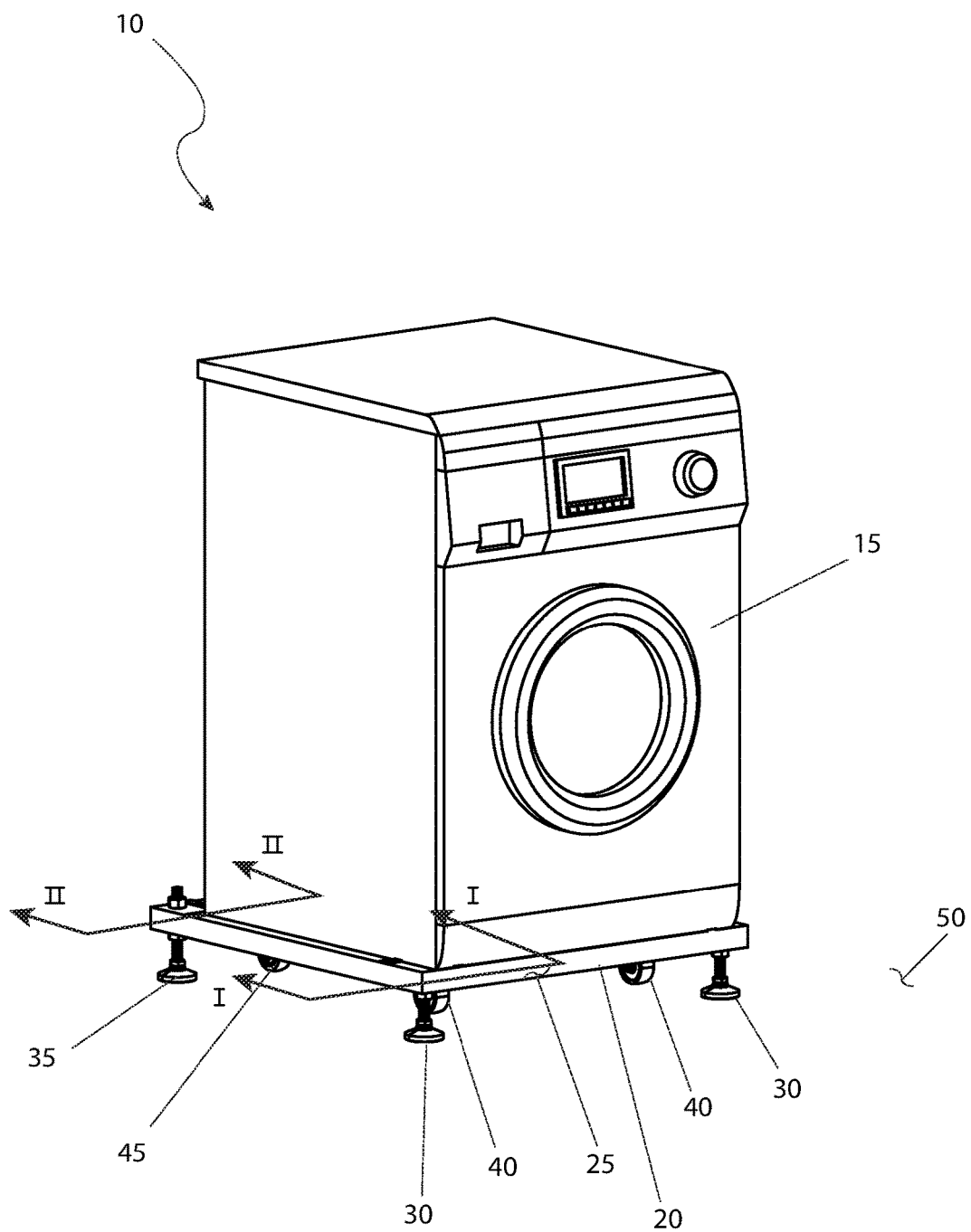
FIG. 1 is a perspective view of the movable operational platform for washer dryer units 10, shown in an installed state, according to the preferred embodiment of the present invention.

DESCRIPTIVE KEY 10 movable operational platform for washer dryer units
15 washer dryer appliance
20 base platform
25 outer finish
30 front leveling feet
35 rear leveling feet
40 front rotating caster
45 rear fixed caster
50 flooring surface
55 recessed area
60 caster wheel
65 axle
70 caster frame
75 caster plate
80 foot base
85 non-marring surface
90 threaded shaft
95 captive nut 100 lock nut
105 top surface
110 stays
115 fastening system
120 front
125 rear
130 exposed area

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIG. 1, a front view of the movable operational platform for washer dryer units 10, shown in an installed state, according to the preferred embodiment of the present invention is disclosed. The movable operational platform for washer dryer units 10 (herein also described as the "device") 10, is provided underneath of a washer dryer appliance 15. It should be noted that it is intended that the device 10 be used in pairs (a first device 10 permanently installed under a washer, and a second device 10 installed under a dryer). However, the device 10 may be used singularly as well (such as an instance where only one (1) appliance requires frequent movement, or in the case of washer/dryer combination appliances, stacked appliances, and the like). As such, usage application is not intended to be a limiting factor of the present invention.

The device 10 includes a base platform 20, envisioned to be made of a structurally competent material such as wood, steel, fiberglass, plastic, or the like. Various manufacturing techniques, complete with necessary reinforcement materials would be utilized based upon the materials of construction. The specific material of construction as well as any specific construction parameters (reinforcement, edge treatment, fasteners, bonding methods, and the like) are not intended to be a limiting factor of the present invention. An outer finish 25 such as paint, plating, laminate, or the like may be applied to increase its aesthetic appeal. The overall size of the invention is envisioned to be approximately twenty-seven square inches (27 in.$^2$) with an overall height of approximately three and three-eighths inches (3⅜ in.) from the floor surface in its mobile position. The overall height in its stationary (usable) position is slightly higher and variable to account for unevenness of the flooring surface where the washer dryer appliance 15 is located. However, the teachings of the device 10 can be adapted to other physical sizes for washer dryer appliance 15 (or similar equipment) of different sizes, and as such, any specific dimension of the device 10, should not be a limiting factor of the present invention.

The base platform 20 is supported by two (2) front leveling feet 30 and two (2) rear leveling feet 35 (only one (1) rear leveling foot 35 is shown due to illustrative limitations) while the device 10 is used in a fixed location to support the washer dryer appliance 15. While in a mobile state, the base platform 20 is supported by two (2) front rotating caster 40 and two (2) rear fixed casters 45 (only one (1) rear fixed caster 45 is shown due to illustrative limitations). While in the mobile state, the front leveling feet 30 and the rear leveling feet 35 are retracted so as to not contact the flooring surface 50. In a preferred embodiment, the front leveling feet 30 are approximately two inches (2 in.) in length and the rear leveling feet 35 are four inches (4 in.) in length.

Figure 2:
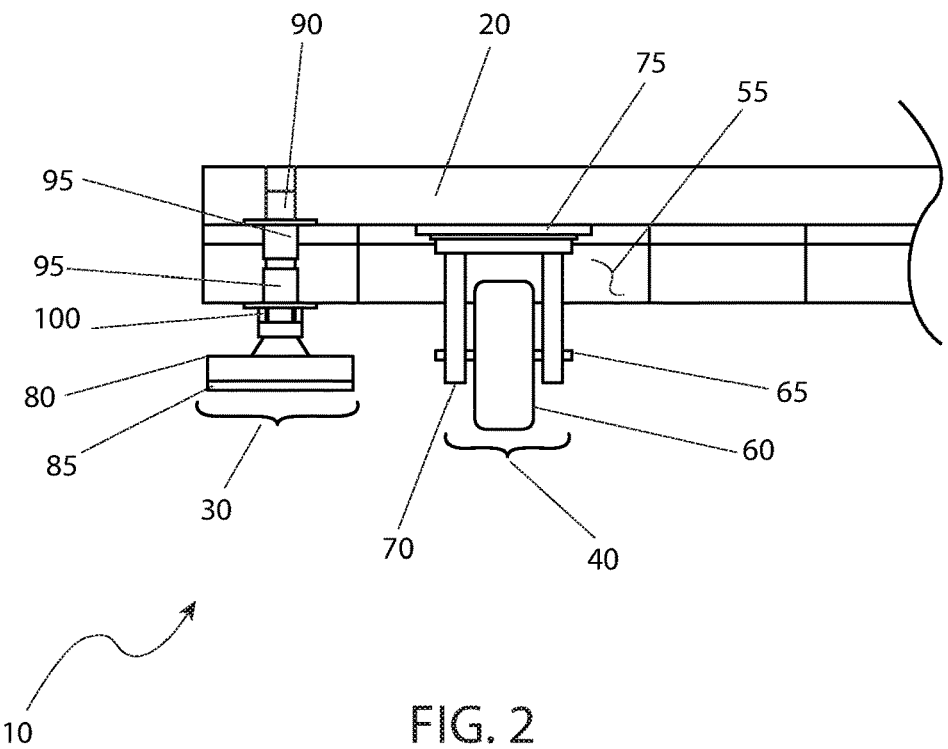
FIG. 2 is a sectional view of the movable operational platform for washer dryer units 10, as seen along a line I-I, as shown in FIG. 1, with the front leveling feet 30 in a retracted position, according to the preferred embodiment of the present invention.

Referring next to FIG. 2, a sectional view of the device 10, as seen along a line I-I, as shown in FIG. 1, with the front leveling feet 30 in a retracted position, according to the preferred embodiment of the present invention is depicted. The front rotating caster 40 is mounted within a recessed area 55 and includes a caster wheel 60 mounted via an axle 65 to a caster frame 70. A caster plate 75 providing three hundred sixty degrees (360°) of rotation is provided atop the caster frame 70 and allows the front rotating caster 40 to freely rotate as needed. The front leveling feet 30 is provided with a foot base 80 and a non-marring surface 85. A threaded shaft 90 connects the top of the foot base 80 to two (2) captive nuts 95 within the base platform 20. A lock nut 100 is used in the typical manner to lock the position of the threaded shaft 90 in place once adjusted. The overall height of the front leveling feet 30 is adjusted using suitable tools such as open-end wrenches, screwdrivers, Allen wrenches or the like. The use of any particularly particular style of height adjustment mechanism is not intended to be a limiting factor of the present invention. This operation is envisioned to be similar to that used when adjusting conventional threaded feet on a conventional washer or dryer. Both the front leveling feet 30 and front rotating casters 40 are envisioned to be capable of bearing the weight of two hundred pounds (200 lbs.), thus providing the device 10 an overall weight capacity of eight hundred pounds (800 lbs.) when the use of the rear leveling feet 35 (as shown in FIG. 1) and the rear fixed caster 45 (as shown in FIG. 1) is considered. In the configuration as shown, the front leveling feet 30 is retracted thus allowing the front rotating caster 40 to bear the weight of the device 10 and thus the washer dryer appliance 15 (as shown in FIG. 1) and allow for easy mobility of the movable operational platform for washer dryer units 10. It is appreciated that the front leveling feet 30 do not extend past or protrude through the upper surface of the base platform 20.

Figure 3:
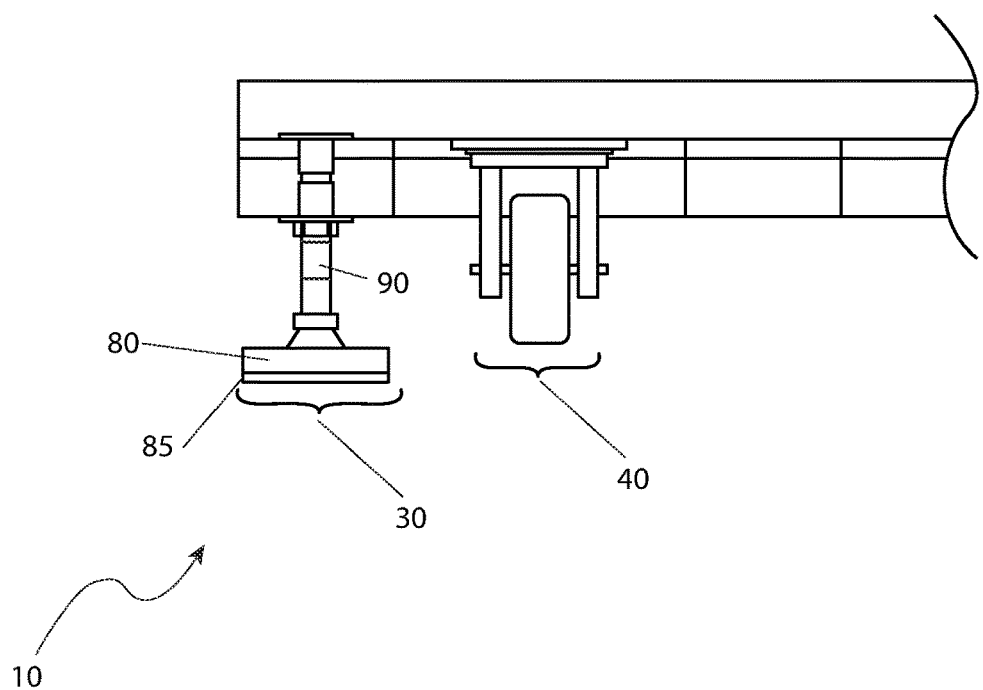
FIG. 3 is a sectional view of the movable operational platform for washer dryer units 10, as seen along a line I-I, as shown in FIG. 1, with the front leveling feet 30 in an extended position, according to the preferred embodiment of the present invention.

Referring now to FIG. 3, a sectional view of the device 10, as seen along a line I-I, as shown in FIG. 1, with the front leveling feet 30 in an extended position, according to the preferred embodiment of the present invention is shown. This arrangement, identical to that of FIG. 2 with the exception of the front leveling feet 30 being extended allows the front leveling feet 30 through the threaded shaft 90, the foot base 80 and the non-marring surface 85, to bear the weight of the device 10 and thus the washer dryer appliance 15 (as shown in FIG. 1). This configuration, envisioned to be the normal configuration of the device 10 is utilized when the washer dryer appliance 15 (as shown in FIG. 1) is in its normal utilization position where the washer dryer appliance 15 (as shown in FIG. 1) is operated. It is noted that the continuously variable nature of the front leveling feet 30 not only provides for positioning the front rotating caster 40 above the flooring surface 50 (as shown in FIG. 1), but also provides leveling ability to compensate for uneven floors.

Figure 4:
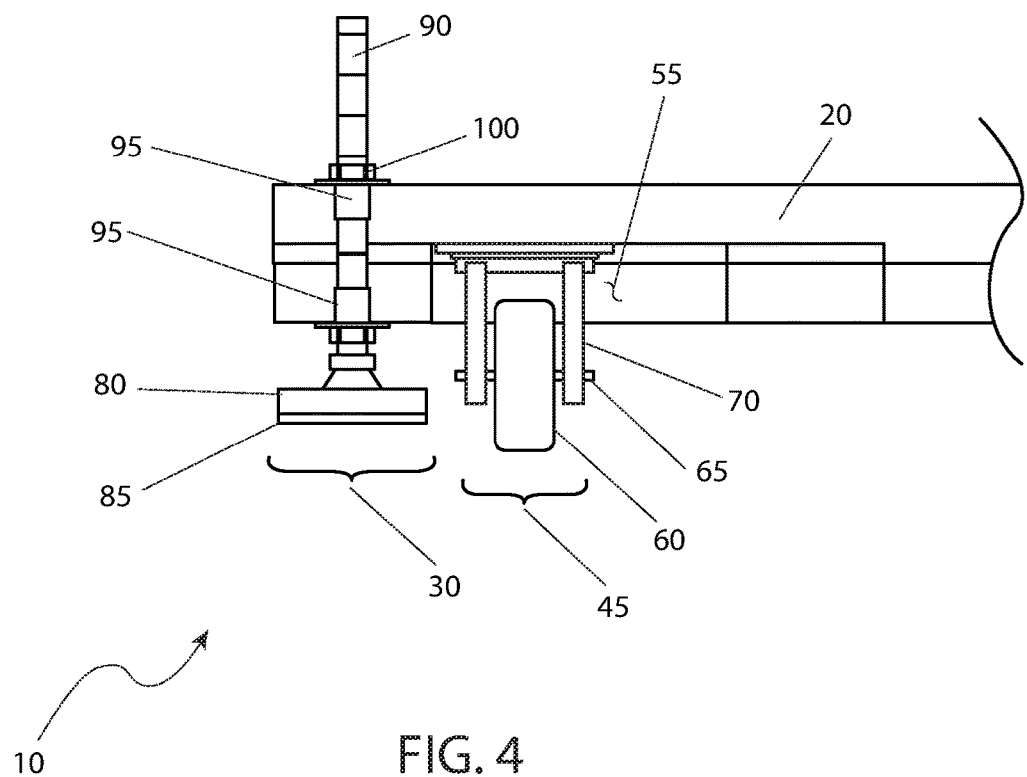
FIG. 4 is a sectional view of the movable operational platform for washer dryer units 10, as seen along a line II-II, as shown in FIG. 1, with the rear leveling feet 35 in a retracted position, according to the preferred embodiment of the present invention.

Referring next to FIG. 4, a sectional view of the device 10, as seen along a line II-II, as shown in FIG. 1, with the rear leveling feet 35 in a retracted position, according to the preferred embodiment of the present invention is disclosed. The rear fixed caster 45 is mounted within a recessed area 55 and consists of a caster wheel 60 mounted via an axle 65 to a caster frame 70. It is noted that the caster plate 75 (as seen in FIG. 2) is not present as the rear fixed caster 45 is fixed in position, thus allows the device 10 to only move forward and backward (not in a three hundred sixty degree (360°) pattern). As before, the rear leveling feet 35 is provided with a foot base 80 and a non-marring surface 85. A threaded shaft 90 connects the top of the foot base 80 to two (2) captive nuts 95 within the base platform 20. A lock nut 100 is used in the typical manner to lock the position of the threaded shaft 90 in place once adjusted, noting that the lock nut 100 is located atop the base platform 20 in lieu of the bottom as shown in FIG. 2. As such, the threaded shaft 90 extends past and protrudes through the upper surface of the base platform 20. The overall height of the rear leveling feet 35 is adjusted using suitable tools such as open-end wrenches, screwdrivers, Allen wrenches or the like. The use of any particularly particular style of height adjustment mechanism is not intended to be a limiting factor of the present invention. Due to the possibility that the rear of the washer dryer appliance 15 (as shown in FIG. 1) is not accessible, the use of long handled or long shaft tools to allow for reaching the threaded shaft 90 and the lock nut 100 from above (at the top level of the washer dryer appliance 15) may be necessary. Both the rear leveling feet 35 and rear fixed casters 45 are envisioned to be capable of bearing the weight of two hundred pounds (200 lbs.), thus providing the device 10 an overall weight capacity of eight hundred pounds (800 lbs.) when the use of the front leveling feet 30 (as shown in FIG. 2) and the front rotating caster 40 (as shown in FIG. 2) is considered. In the configuration as shown, the rear leveling feet 35 is retracted thus allowing the rear fixed caster 45 to bear the weight of the device 10 and thus the washer dryer appliance 15 (as shown in FIG. 1) and allow for easy mobility of the device 10.

Figure 5:
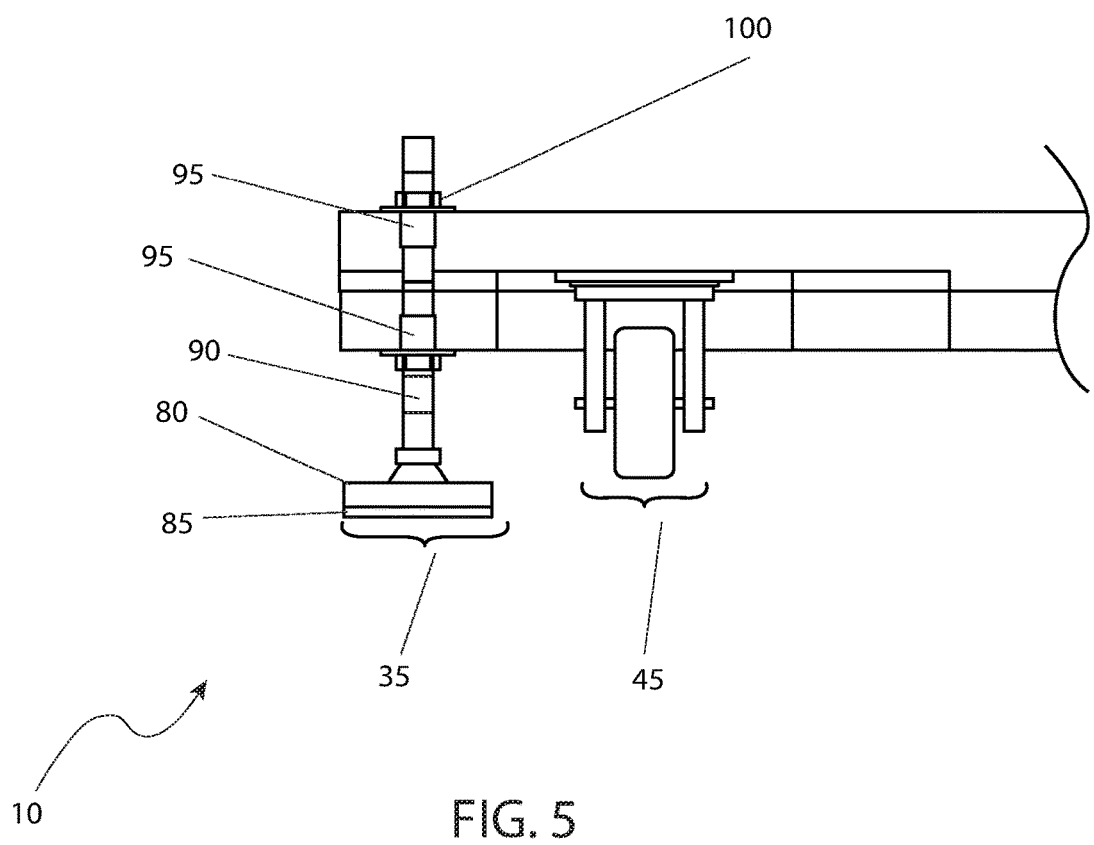
FIG. 5 is a sectional view of the movable operational platform for washer dryer units 10, as seen along a line II-II, as shown in FIG. 1, with the rear leveling feet 35 in an extended position, according to the preferred embodiment of the present invention.

Referring now to FIG. 5, a sectional view of the device 10, as seen along a line II-II, as shown in FIG. 1, with the rear leveling feet 35 in an extended position, according to the preferred embodiment of the present invention is depicted. This arrangement, identical to that of FIG. 4 with the exception of the rear leveling feet 35 being extended allows the rear leveling feet 35 through the threaded shaft 90, the foot base 80 and the non-marring surface 85, to bear the weight of the device 10 and thus the washer dryer appliance 15 (as shown in FIG. 1). This configuration, envisioned to be the normal configuration of the device 10 is utilized when the washer dryer appliance 15 (as shown in FIG. 1) is in its normal utilization position where the washer dryer appliance 15 (as shown in FIG. 1) is operated. It is noted that the continuously variable nature of the rear leveling feet 35 not only provides for positioning the rear fixed caster 45 above the flooring surface 50 (as shown in FIG. 1), but also provides leveling ability to compensate for uneven floors.

Figure 6:
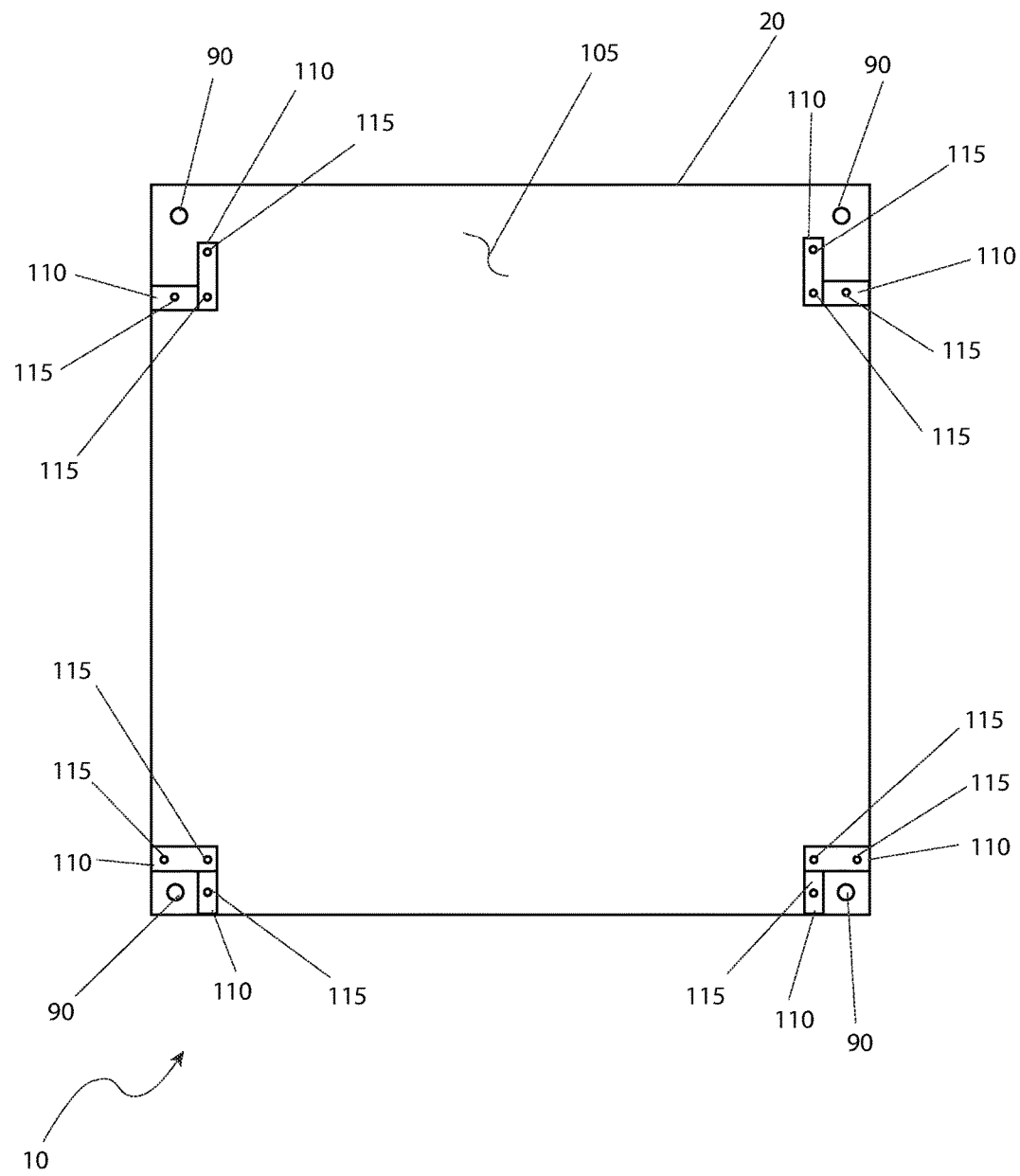
FIG. 6 is a top view of the movable operational platform for washer dryer units 10, according to the preferred embodiment of the present invention; and, FIG. 7 is a bottom view of the movable operational platform for washer dryer units 10, according to the preferred embodiment of the present invention.

Referring next to FIG. 6, a top view of the device 10, according to the preferred embodiment of the present invention is shown. Four (4) openings of the threaded shaft 90 for the two (2) front leveling feet 30 (as shown in FIG. 1) and the two (2) rear leveling feet 35 (as shown in FIG. 1) are visible. Also, visible on a top surface 105 on the base platform 20 is a series of stays 110. The stays 110 are used to help position and hold the typical threaded adjustable feet that are commonly provided on the bottom of a washer dryer appliance 15 (as shown in FIG. 1). As such, the stays 110 prevent the washer dryer appliance 15 (as shown in FIG. 1) from slipping or sliding off of the device 10 due to vibration during utilization of the washer dryer appliance 15 (as shown in FIG. 1). The physical location of the stays 110 are dependent upon the location of the feet of the washer dryer appliance 15 (as shown in FIG. 1), and will thus vary from manufacturer to manufacturer. The stays 110 are held in place via fastening system 115 including but not limited to adhesive, screws, nails, bolts, rivets or the like.

Figure 7:
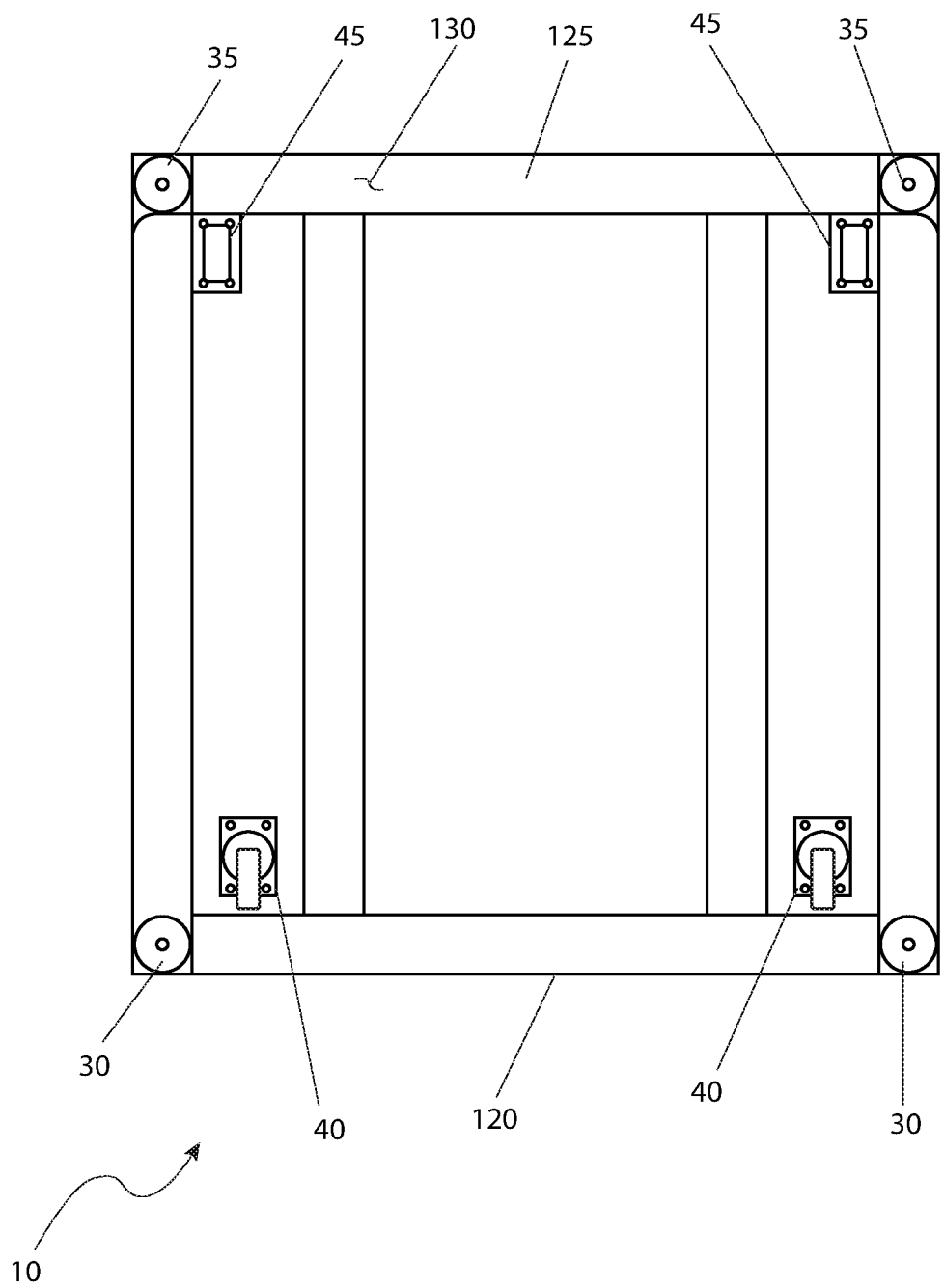

Referring finally to FIG. 7, a bottom view of the device 10, according to the preferred embodiment of the present invention is disclosed. This view clearly depicts the front leveling feet 30 and the front rotating caster 40 near the front 120 of the device 10 while the rear leveling feet 35 and the rear fixed caster 45 are visible towards at the rear 125 of the device 10. It is noted that the device 10 is completely underneath the washer dryer appliance 15 (as shown in FIG. 1) with the exception of an exposed area 130 at the rear 125 of the device 10. This exposed area 130, not covered by the washer dryer appliance 15 (as shown in FIG. 1) allows access to the threaded shaft 90 (as shown in FIGS. 4 and 5) from above. Additionally, the rotatable nature of the front rotating caster 40 coupled with the fixed nature of the rear fixed caster 45, functions in much the same manner as a conventional grocery shopping cart and provides for easy mobility of the device 10 and thus the washer dryer appliance 15 (as shown in FIG. 1).

The preferred embodiment of the present invention can be utilized by the common user in a simple and effortless manner with little or no training. It is envisioned that the device 10 would be constructed in general accordance with FIG. 1 through FIG. 7. The user would procure the device 10 through normal procurement channels. In addition to being purchased as part of an add-on kit, the device 10 could be sold as an integral option with new washer dryer appliance 15. Special attention would be utilized with regards to overall size of the device 10 for the specific use intended.

After procurement and prior to utilization, the device 10 would be prepared in the following manner: measurements of the adjustable feet typically provided on the washer dryer appliance 15 are taken and transferred to the top surface 105 of the device 10; the stays 110 are fastened into the required position, the washer dryer appliance 15 is placed atop the device 10; the front leveling feet 30 and the rear leveling feet 35 would be raised or retracted (as shown in FIGS. 2 and 4) thus placing the device 10 into a mobile configuration.

During utilization of the device 10, the following procedure would be initiated: the device 10 with the washer dryer appliance 15 atop, is pushed into the utilization location; any necessary utility hookups including electric, gas, water, waste, vents, and the like would be made utilizing the mobility of the washer dryer appliance 15 as an advantage; the washer dryer appliance 15 is positioned into final position; the front leveling feet 30 and the rear leveling feet 35 lowered or extended (as shown in FIGS. 3 and 5), verification of balance would be performed using a conventional carpenters level atop the washer dryer appliance 15; necessary adjustments to the front leveling feet 30 and the rear leveling feet 35 would be made all the while ensuring that the front rotating caster 40 and rear fixed caster 45 are not in contact with the flooring surface 50. At this point in time the washer dryer appliance 15 may be utilized in a normal manner.

Should access ever be needed behind or near the washer dryer appliance 15 for purposes of cleaning, repair, movement for access to other mechanical equipment, piping, and the like, the user may reverse the above process by once again raising the front leveling feet 30 and the rear leveling feet 35 (as shown in FIGS. 2 and 4) thus placing the device 10 into a mobile configuration. This repetitive process may be repeated as necessary in in a circular manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A portable platform for an appliance, comprising:
   a base platform having an upper wall and a bottom wall;
   a pair of front foot assemblies, each capable of being adjustable relative to said base platform;
   a pair of rear foot feet assemblies, each capable of being adjustable relative to said base platform;
   a pair of rotating caster assemblies located on a front of said base platform;
   a pair of fixed caster assemblies located on a rear of said base platform; and,
   four stay assemblies, each affixed to and located adjacent to a corner of said base platform upper wall;
   wherein each stay assembly is configured to securely retain a leg of said appliance therein;
   wherein said pair of rotating caster assemblies includes a caster wheel mounted via an axle to a caster frame, said caster frame mounted to a caster plate, wherein said caster plate is rotatably attached to said base platform bottom wall; and
   wherein said pair of rotating caster assemblies are mounted within a recessed area;
   wherein said base platform includes a protective coating;
   wherein each of said pair of front foot assemblies includes a first foot base, a first shaft adjustably attached to said base platform, said first shaft having a first shaft first end affixed to said first foot base, and each of said pair of rear foot assemblies includes a second foot base and, a second shaft adjustably attached to said base platform, said second shaft having a second shaft first end affixed to said second foot base;
   wherein each of said pair of front foot assemblies includes a first non-marring surface located on a bottom surface of said first foot base and, each of said pair of rear foot assemblies includes a second non-marring surface located on a bottom surface of said second foot base;
   wherein said second shaft passes through said base platform bottom wall and said base platform upper wall;
   wherein each of said pair of front foot assemblies includes a first non-marring surface located on a bottom surface of said first foot base, and, each of said pair of rear foot assemblies includes a second non-marring surface located on a bottom surface of said second foot base;
   wherein said leveling feet provides leveling ability to compensate for uneven floors.

2. The portable platform of claim 1, wherein said pair of fixed caster assemblies further comprises a caster wheel mounted via an axle to a caster frame, wherein said caster frame is fixedly attached to said base platform bottom wall.

3. The portable platform of claim 2, wherein said pair of fixed caster assemblies are mounted within a recessed area.

4. A portable platform for an appliance, comprising:
   a base platform having an upper wall and a bottom wall;
   a pair of front foot assemblies, each capable of being adjustable relative to said base platform, each having a first locking device to secure a desired first relative position;
   a pair of rear foot assemblies, each capable of being adjustable relative to said base platform, each having a second locking device to secure a desired second relative position;
   a pair of rotating caster assemblies located on a front of said base platform;
   a pair of fixed caster assemblies located on a rear of said base platform; and,
   four stay assemblies, each affixed to and located adjacent to a corner of said base platform upper wall;
   wherein each stay assembly is configured to securely retain a leg of said appliance therein;
   wherein said pair of rotating caster assemblies includes a caster wheel mounted via an axle to a caster frame, said caster frame mounted to a caster plate, wherein said caster plate is rotatably attached to said base platform bottom wall;
   wherein said pair of rotating caster assemblies are mounted within a recessed area;
   wherein said base platform includes a protective coating;
   wherein each of said pair of front foot assemblies includes a first foot base, and, a first shaft adjustably attached to said base platform, having a first shaft first end affixed to said first foot base, and, each of said pair of rear foot assemblies include a second foot base, and, a second shaft adjustably attached to said base platform, having a second shaft first end affixed to said second foot base;
   wherein said second shaft passes through said base platform bottom wall and said base platform upper wall;
   wherein each of said pair of front foot assemblies includes a first non-marring surface located on a bottom surface of said first foot base, and, each of said pair of rear foot assemblies includes a second non-marring surface located on a bottom surface of said second foot base; and
   wherein each of said pair of front foot assemblies includes a first non-marring surface located on a bottom surface of said first foot base, and, each of said pair of rear foot assemblies includes a second non-marring surface located on a bottom surface of said second foot base.

5. The portable platform of claim 4, wherein said pair of fixed caster assemblies further comprises a caster wheel mounted via an axle to a caster frame wherein said caster frame is fixedly attached to said base platform bottom wall.

6. The portable platform of claim 5, wherein said pair of fixed caster assemblies are mounted within a recessed area.

* * * * *